(12) United States Patent
Garces et al.

(10) Patent No.: US 11,627,743 B2
(45) Date of Patent: Apr. 18, 2023

(54) RACK ASSEMBLY FOR AN INDOOR SMOKER

(71) Applicant: Haier US Appliance Solutions, Inc., Wilmington, DE (US)

(72) Inventors: Tomas Garces, Louisville, KY (US); Daniel Carballo, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 193 days.

(21) Appl. No.: 16/738,223

(22) Filed: Jan. 9, 2020

(65) Prior Publication Data

US 2021/0212329 A1 Jul. 15, 2021

(51) Int. Cl.
*A22C 15/00* (2006.01)
*A47J 37/06* (2006.01)
*A23B 4/044* (2006.01)

(52) U.S. Cl.
CPC ............ *A22C 15/007* (2013.01); *A23B 4/044* (2013.01); *A47J 37/0629* (2013.01)

(58) Field of Classification Search
CPC ....... A23B 4/044; A23B 4/052; A22C 15/007; A47J 37/0629
See application file for complete search history.

(56) References Cited

U.S. PATENT DOCUMENTS

| | | | | |
|---|---|---|---|---|
| 3,856,374 A * | 12/1974 | Christen | ................. | A23B 4/052 312/263 |
| 4,232,597 A * | 11/1980 | Perrine | ................... | A23B 4/052 99/468 |
| 5,529,052 A * | 6/1996 | Sanchez | .................... | A21B 1/26 126/261 |
| 7,451,691 B2 * | 11/2008 | Robertson | ................ | A21B 3/04 219/401 |
| 9,930,897 B2 * | 4/2018 | Blue | ....................... | A23B 4/052 |
| 10,314,433 B1 | 6/2019 | Knight | | |
| 2004/0191146 A1 * | 9/2004 | Shinohara | ................ | F23J 15/08 423/240 R |
| 2004/0226550 A1 * | 11/2004 | Hutton | .................... | A23B 4/052 126/25 R |
| 2009/0136638 A1 * | 5/2009 | Fujie | ....................... | A23B 4/052 426/314 |
| 2014/0123861 A1 * | 5/2014 | Cooper | ................. | A47J 37/0611 99/374 |
| 2014/0360387 A1 * | 12/2014 | Bogdon | ............... | A23B 4/0523 99/476 |
| 2016/0100594 A1 * | 4/2016 | Barber | ................... | A23B 4/052 99/481 |

* cited by examiner

*Primary Examiner* — Erin E McGrath
(74) *Attorney, Agent, or Firm* — Dority & Manning, P.A.

(57) ABSTRACT

An indoor smoker includes a smoking chamber that is defined at least in part by a chamber wall and a smoke generating assembly for providing a flow of smoke into the smoking chamber through a chamber inlet defined in the chamber wall. A rack assembly is positioned within the smoking chamber and includes a ladder rack mounted to the chamber wall for supporting a plurality of racks. The ladder rack includes L-shaped mounting flanges that are secured to the chamber wall and a support plate that is secured to the distal ends of the mounting flanges to define a flow plenum for distributing the flow of smoke throughout the smoking chamber.

20 Claims, 9 Drawing Sheets

RACK ASSEMBLY FOR AN INDOOR SMOKER

FIELD OF THE INVENTION

The present subject matter relates generally to indoor smokers, and more particularly to rack assemblies for indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Conventional smokers include a single firebox that is coupled to the smoking chamber through a single smoke inlet. In addition, conventional smokers include a single smoke outlet for allowing the flow of smoke to exit the smoking chamber. As a result, the flow of smoke generated in the firebox tends to pass directly from the smoke inlet to the smoke outlet. This results in poor smoke distribution and diffusion throughout the smoking chamber. In addition, if a large mass of meat is positioned within the smoking chamber between the smoke inlet and the smoke outlet, this meat may tend to block the flow of smoke altogether. Conventional smokers do not have features for preventing such a flow blockage within the smoking chamber.

Accordingly, a smoker that has features for improved smoke diffusion and distribution would be useful. More specifically, a rack assembly that promotes smoke distribution to every rack position and includes bypass features for mitigating the effects of chamber blockages would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker defining a vertical direction and a horizontal direction is provided including a cabinet, a smoking chamber positioned within the cabinet, the smoking chamber being defined at least in part by a chamber wall, a smoke generating assembly for providing a flow of smoke into the smoking chamber through a chamber inlet defined in the chamber wall, and a rack assembly positioned within the smoking chamber. The rack assembly includes a ladder rack mounted to the chamber wall, the ladder rack including a support plate that is spaced apart from the chamber wall to define a flow plenum, the support plate defining one or more receiving slots, and one or more racks removably mountable in the receiving slots of the ladder rack.

In another aspect of the present disclosure, a rack assembly for an indoor smoker, the indoor smoker including a smoking chamber positioned within a cabinet and being defined at least in part by a chamber wall, the chamber wall defining a chamber inlet for receiving a flow of smoke from a smoke generating assembly. The rack assembly includes a ladder rack mounted to the chamber wall, the ladder rack including a support plate that is spaced apart from the chamber wall to define a flow plenum, the support plate defining one or more receiving slots, and one or more racks removably mountable in the receiving slots of the ladder rack.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 1:
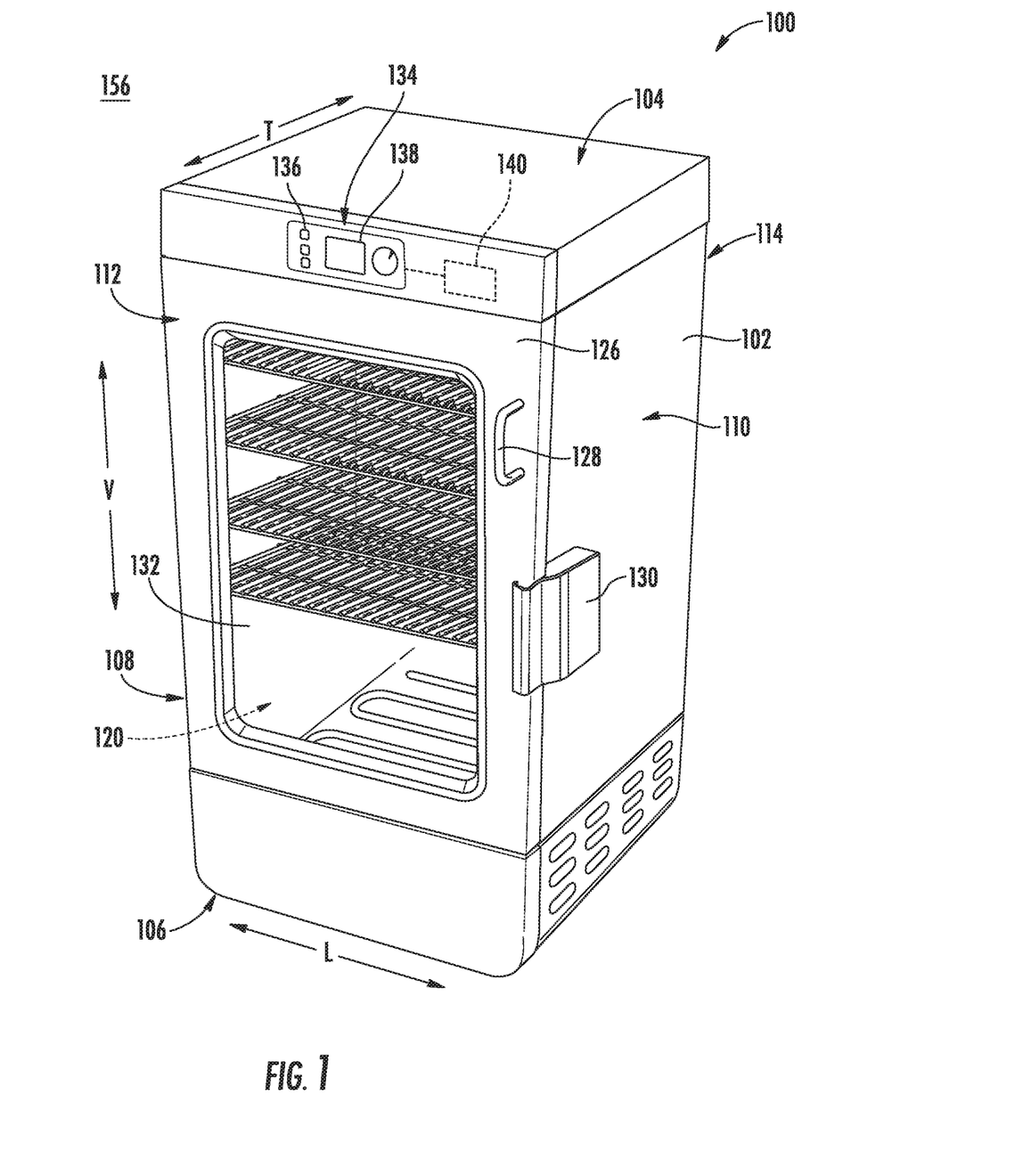
FIG. 1 provides a perspective view of an indoor smoker with a door in a closed position in accordance with an example embodiment of the present disclosure.
Figure 2:
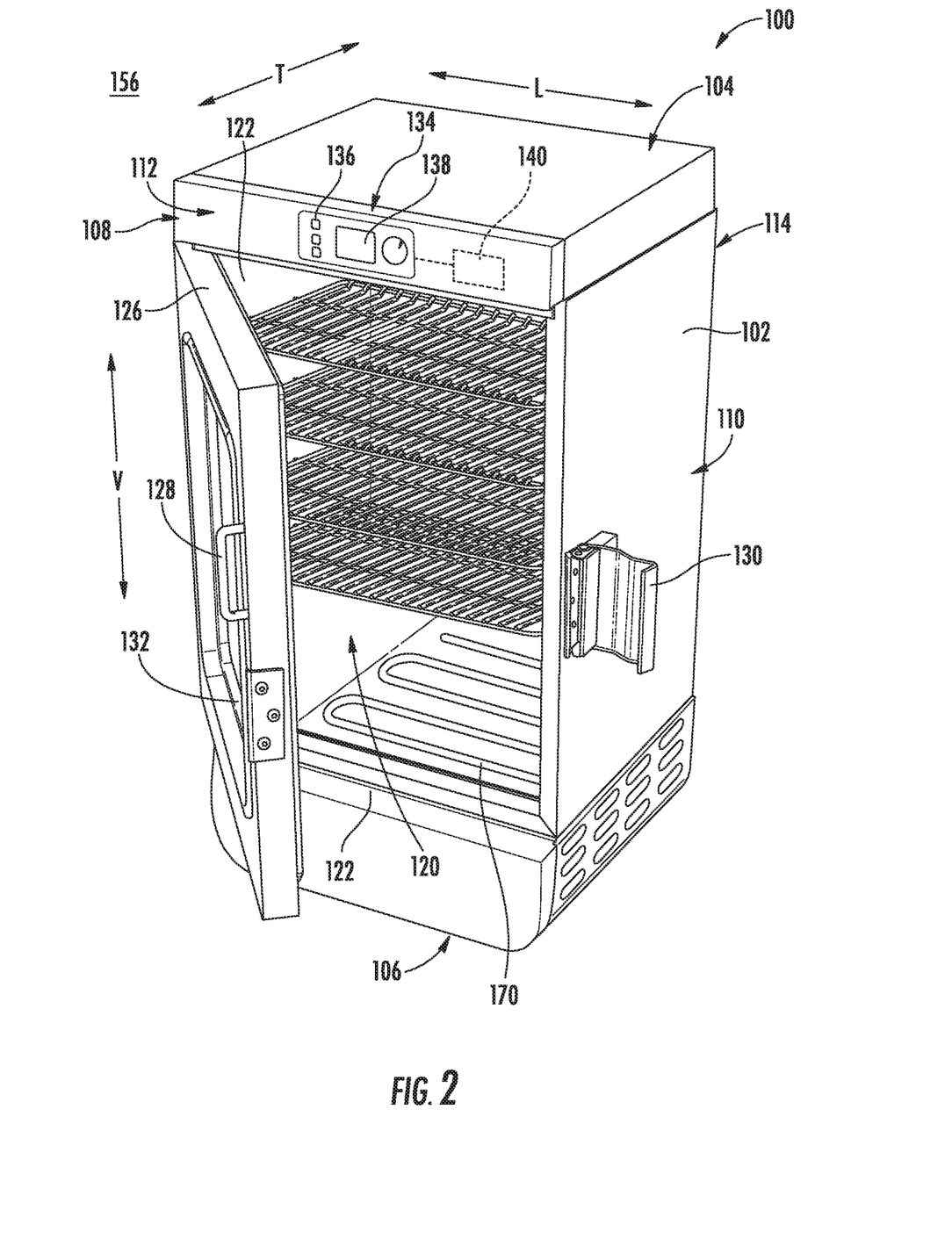
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. A horizontal direction H is understood as a plane defined by the lateral direction L and the transverse direction T, e.g., perpendicular to the vertical direction V. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulation gap 124 (FIG. 4) defined between chamber walls 122 and cabinet 102. According to an exemplary embodiment, insulation gap 124 is filled with insulating material (not shown), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or harmful emissions in an appliance.

Figure 3:
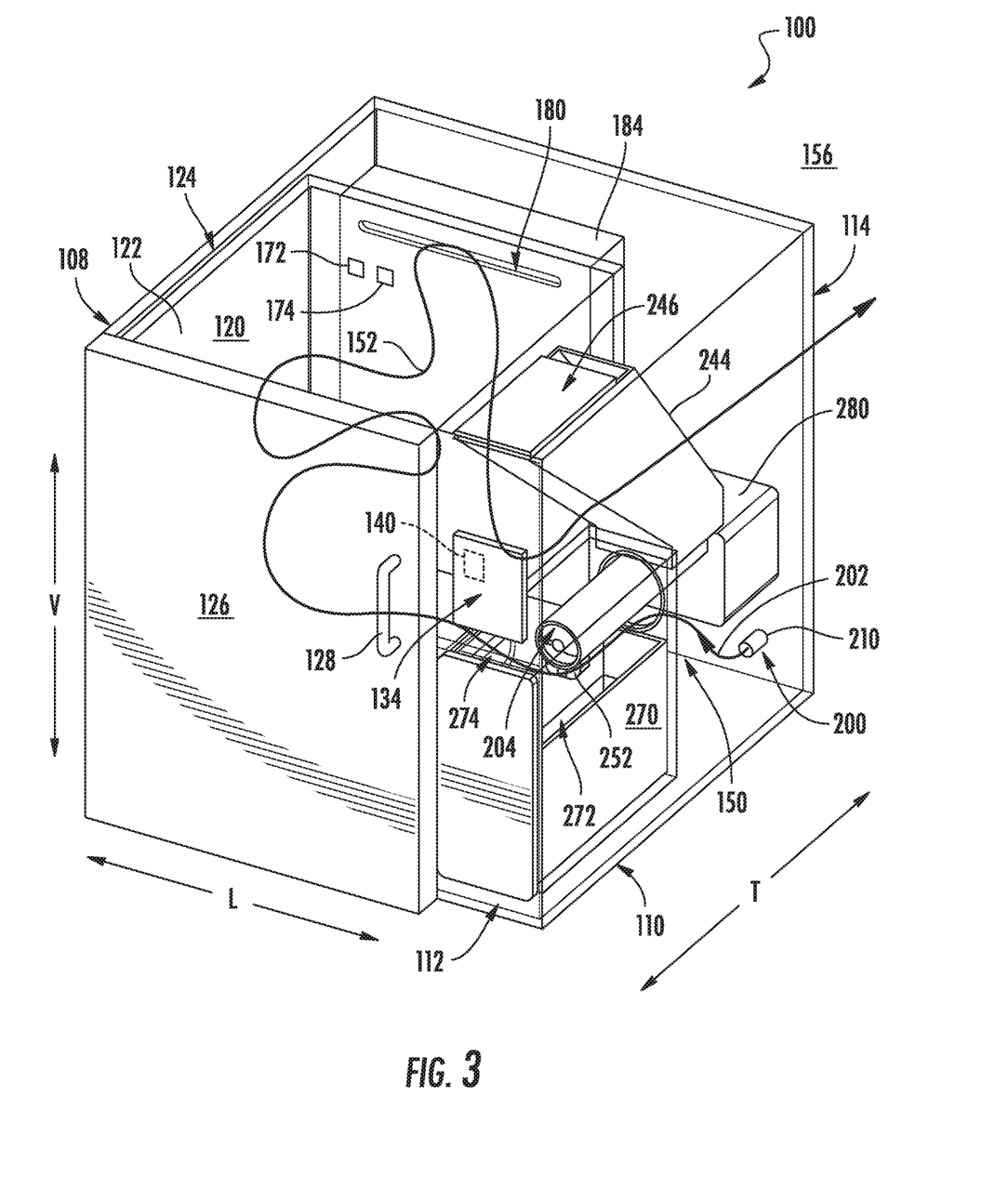
FIG. 3 provides a partial perspective view of an indoor smoker according to an exemplary embodiment of the present subject matter.

Referring now also to FIG. 3, various internal components of an indoor smoker 100 and their respective functions will be described according to an exemplary embodiment of the present subject matter. In this regard, FIG. 3 illustrates a partial perspective view of an indoor smoker 100 similar to that shown in FIG. 1. As shown, indoor smoker 100 generally includes smoking chamber 120 for receiving items to be cooked/smoked, a smoke generating device or smoke generating assembly 150 for generating a flow of smoke (indicated by reference numeral 152 in FIG. 3), and an exhaust system 154 for safely discharging that the air and/or smoke into an indoor environment 156 (i.e., outside of indoor smoker 100). Each of these systems and components will be described in detail below.

Referring still to FIG. 3, smoke generating assembly 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, smoke generating assembly 150 may include a door or another access panel (not shown) for providing selective access to smoldering chamber 160, e.g., to add additional combustible material 162. Smoke generating assembly 150 will be described in more detail below with respect to FIGS. 3 through 6.

In order to ensure a desirable cooking temperature within smoking chamber 120, indoor smoker 100 further includes a chamber heater 170 that is positioned within or otherwise in thermal communication with smoking chamber 120 for regulating the temperature in smoking chamber 120. In general, chamber heater 170 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 170 is operated independently of smoke generating assembly 150 (e.g., as described below), smoking chamber 120 may be maintained at any suitable temperature during a smoking process. More specifically, for example, chamber heater 170 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120 and/or smoldering chamber 160. More specifically, as illustrated, indoor smoker 100 includes a temperature sensor 172 and a humidity sensor 174 positioned within smoking chamber 120 and being operably coupled to controller 140. In some embodiments, controller 140 is configured to vary operation of chamber heater 170 based on one or more temperatures detected by temperature sensor 172 or humidity measurements from humidity sensor 174.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 172 and humidity sensor 174 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

As mentioned briefly above, indoor smoker 100 further includes an exhaust system 154 which is generally configured for safely discharging the flow of smoke 152 from indoor smoker 100. Specifically, according to the illustrated embodiment, exhaust system 154 generally extends between a chamber outlet 180 and a discharge vent 182 defined by cabinet 102 for directing the flow of smoke 152 from smoking chamber 120 to the environment 156. Although an exemplary exhaust system 154 is described below, it should be appreciated that variations and modifications may be made while remaining within the scope of the present subject matter. For example, the routing of ducts, the catalytic converter arrangement, and the types of sensors used may vary according to alternative embodiments.

As shown, exhaust system 154 includes an exhaust duct 184 that generally extends between and provides fluid communication between chamber outlet 180 and discharge vent 182. Indoor smoker 100 further includes an air handler 186 that is operably coupled with exhaust duct 184 facilitating the smoldering process and smoke generating process. For example, air handler 186 urges the flow of smoke 152 through exhaust duct 184 and out of discharge vent 182 to environment 156. According to the illustrated exemplary embodiment, air handler 186 is an axial fan positioned within exhaust duct 184. However, it should be appreciated that according to alternative embodiments, air handler 186 may be positioned at any other suitable location and may be any other suitable fan type, such as a tangential fan, a centrifugal fan, etc.

In addition, according to an exemplary embodiment, air handler 186 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 186 or throttling air handler 186 between different rotational speeds, the flow of smoke 152 drawn into smoking chamber 120 may enter from a different direction, may have a different flow velocity, or may generate a different flow pattern within smoking chamber 120. Thus, by pulsating the variable speed fan or otherwise varying its speed, the flow of smoke 152 may be randomized, thereby eliminating stagnant regions within smoking chamber 120 and better circulating the flow of smoke 152 to provide a more even cooking/smoking profile.

As illustrated, indoor smoker 100 further includes a catalytic converter 190 which is positioned within exhaust duct 184 for lowering or removing volatile organic compounds (VOCs) from the flow of smoke 152. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 190 generally includes a catalytic element 192 and a catalyst heater 194.

In general, catalytic element 192 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 192 may combine oxygen ($O_2$) with carbon monoxide (CO) and unburned hydrocarbons to produce carbon dioxide ($CO_2$) and water ($H_2O$). In addition, according to exemplary embodiments, catalytic element 192 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 194 is in thermal communication with catalytic element 192 for heating it to a suitable temperature, such as approximately 800° F. According to the illustrated embodiment, catalyst heater 194 is positioned upstream of catalytic element 192 to provide thermal energy through convection. However, it should be appreciated that according to alternative embodiments, catalyst heater 194 may be in direct contact with catalytic element 192 to provide thermal energy through conduction, or may be thermally coupled to catalytic element 192 in any other suitable manner. In order to ensure a catalyst temperature of catalytic element 192 remains above a temperature suitable for controlling emissions, indoor smoker 100 may further include a catalyst temperature sensor (not shown) that may be monitored by controller 140.

Figure 4:
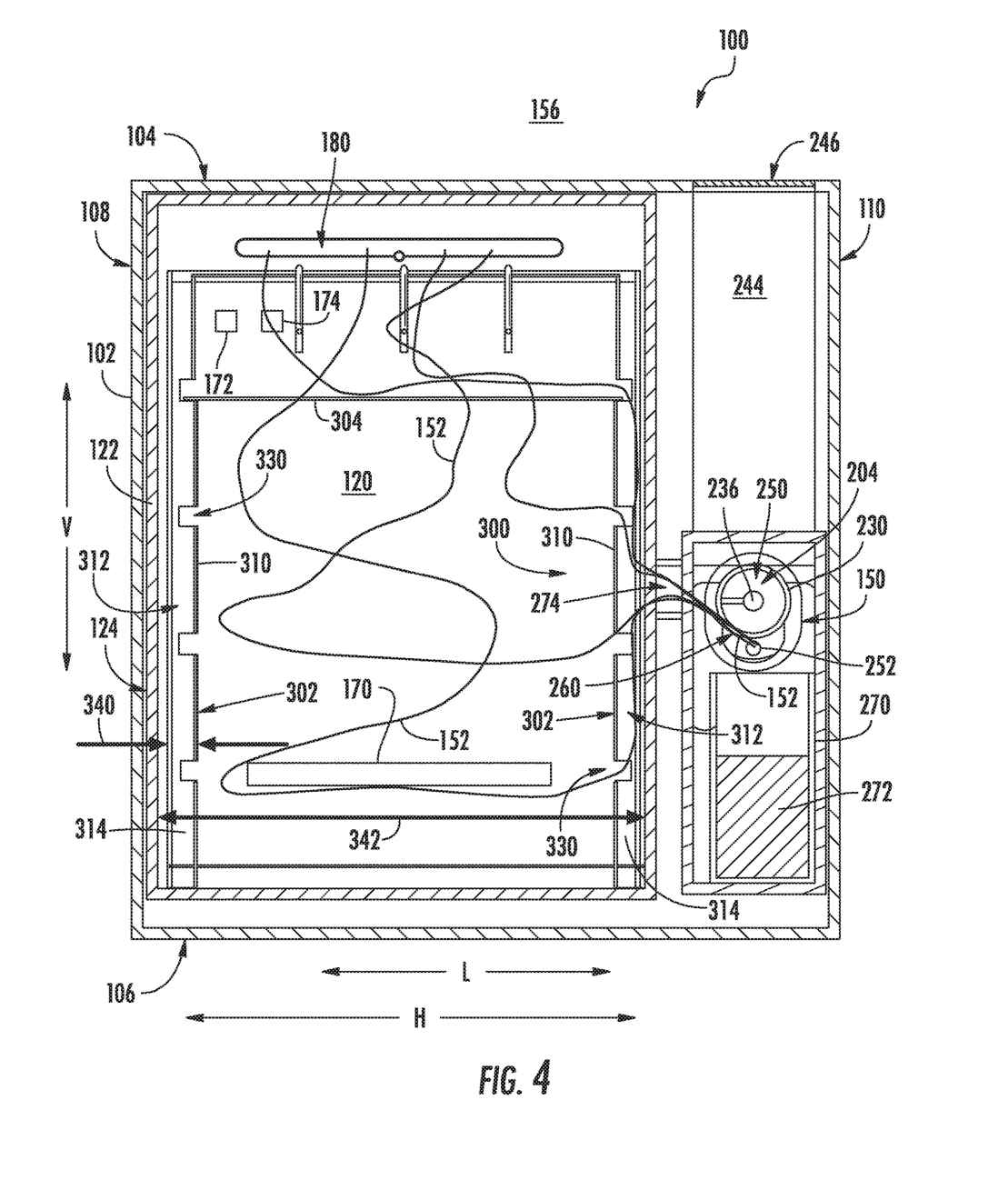
FIG. 4 is a front cross sectional view of the exemplary indoor smoker of FIG. 3 according to an exemplary embodiment of the present subject matter.
Figure 5:
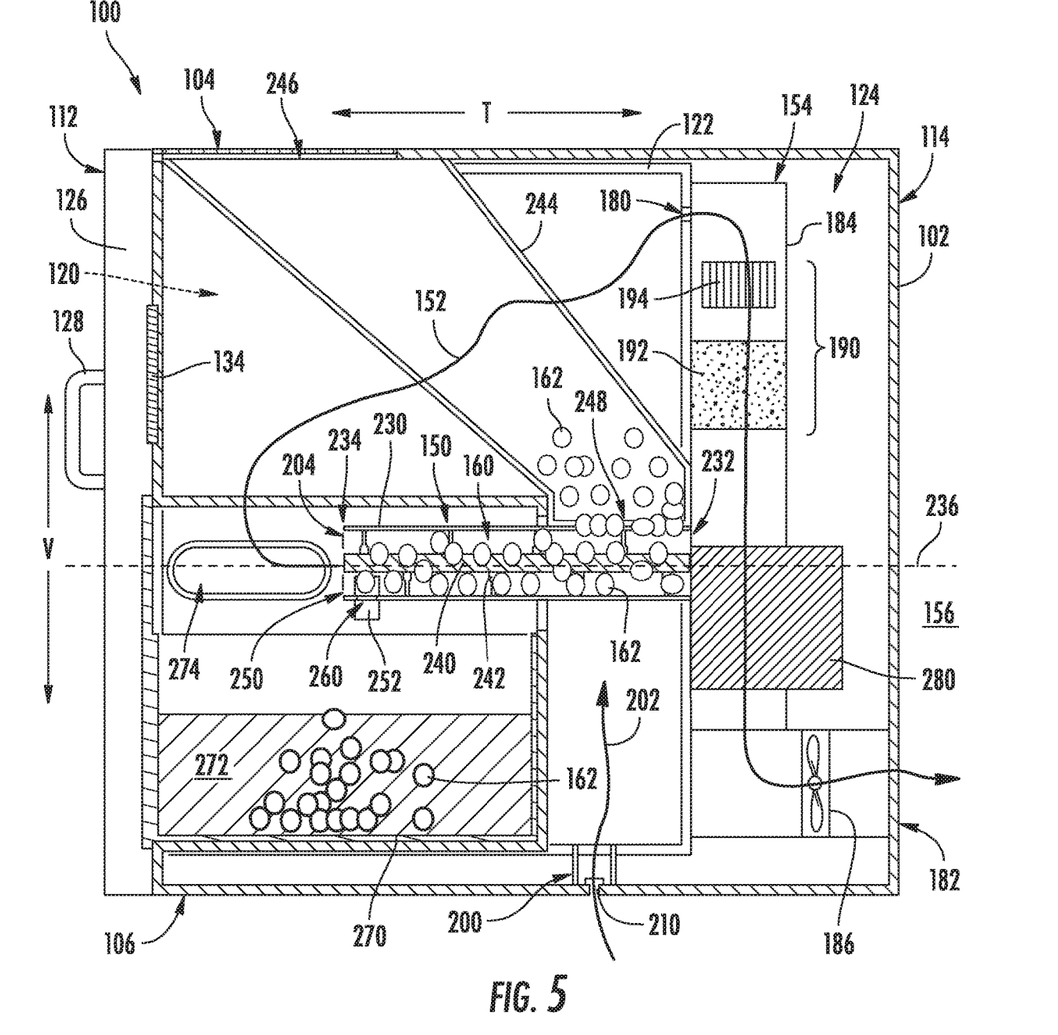
FIG. 5 is a side cross sectional view of the exemplary indoor smoker of FIG. 3 according to an exemplary embodiment of the present subject matter.

Referring now specifically to FIGS. 3 through 6, the construction and operation of smoke generating assembly 150 will be described in more detail according to an exemplary embodiment of the present subject matter. As best shown in FIG. 5, indoor smoker 100 defines an air inlet 200 for receiving air to support the combustion or smoldering process. Specifically, air inlet 200 is configured for receiving a flow of combustion air (indicated by reference numeral 202 in FIG. 5) from the ambient environment 156 surrounding indoor smoker 100 or from another air supply source. During a smoking process, combustible material 162 is ignited and the flow of combustion air 202 supports the smoldering process to generate the flow of smoke 152. Smoke generating assembly 150 further defines a smoke outlet 204 for providing a flow of smoke 152 into smoking chamber 120 during a smoking operation, as will be described in detail below.

In addition, indoor smoker 100 may further include features for preventing or regulating the flow of combustion air 202 from entering indoor smoker 100 from environment 156 when the flow of such air is not desired. In this regard, for example, indoor smoker 100 may include an inlet check valve 210 which is operably coupled to air inlet 200. In general, this check valve prevents the flow of combustion air 202 from entering smoldering chamber 160 when not desired. For example, inlet check valve 210 may have a "cracking pressure," which is used herein to refer to the pressure, or more precisely the negative pressure, required within smoldering chamber 160 to open inlet check valve 210. In this manner, inlet check valve 210 may be designed to permit the flow of combustion air 202 only when air handler 186 is operating and urging air through smoldering chamber 160, thus facilitating the quick and effective asphyxiation of combustible material 162 within smoldering chamber 160 when desired.

Figure 6:
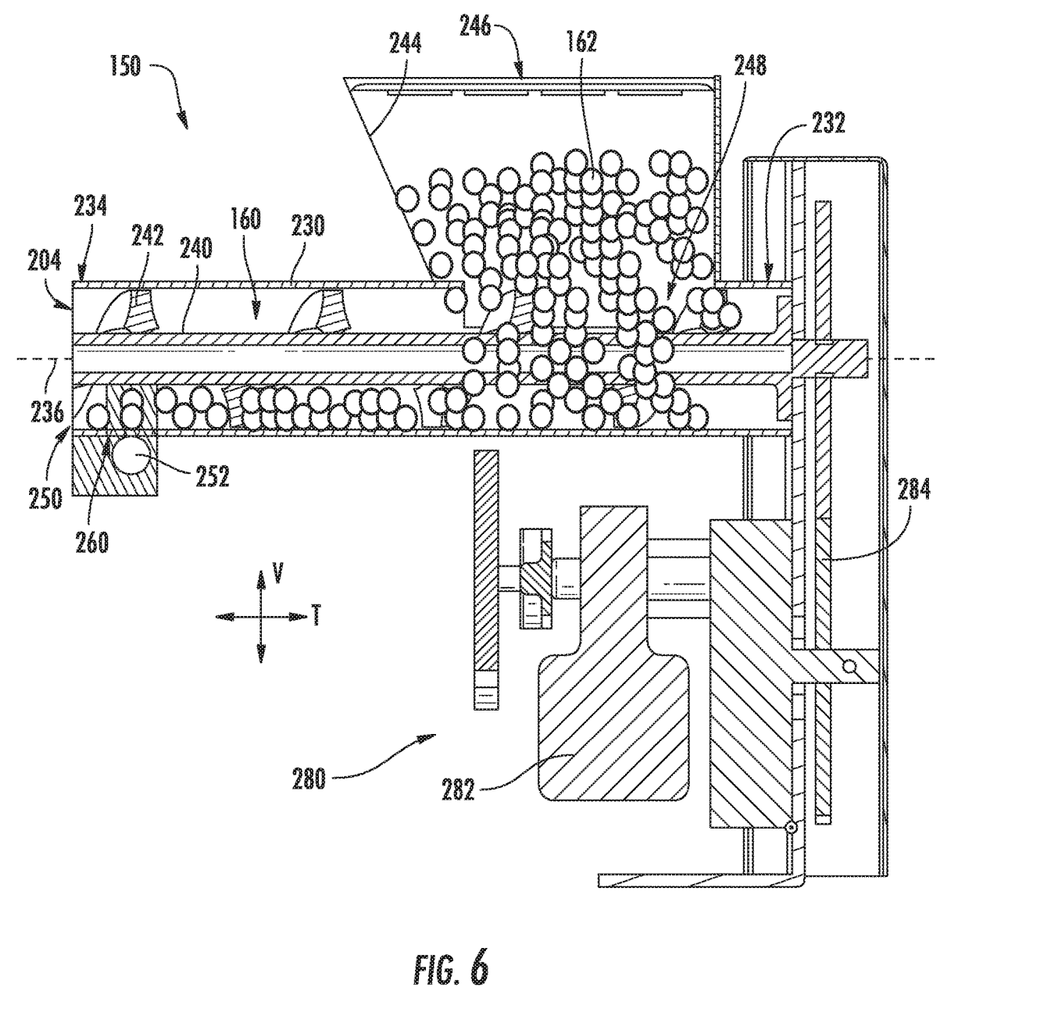
FIG. 6 is a schematic cross sectional view of a smoke generating assembly for use with the exemplary indoor smoker of FIG. 3 according to an exemplary embodiment of the present subject matter.

Referring now specifically to FIGS. 5 and 6, according to the illustrated embodiment, smoke generating assembly 150 generally includes a smoke barrel 230 that defines smoldering chamber 160. Specifically, smoke barrel 230 extends between a first end 232 and a second end 234 substantially along a central axis 236. Specifically, as illustrated, central axis 236 extends substantially within a horizontal plane within cabinet 102, e.g., directly along the transverse direction T. In general, smoke barrel 230 is configured for receiving the combustible material 162 and facilitating a smoldering process. As shown, smoke barrel 230 has a substantially cylindrical shape and is formed from a substantially rigid and temperature resistant material, such as steel. However, it should be appreciated that smoke barrel 230 may be formed from different materials, may have different geometries, and may be configured differently within cabinet 102 according to alternative embodiments of the present subject matter.

Smoke generating assembly 150 further includes a rotating auger 240 that is rotatably mounted within smoldering chamber 160 and generally rotates about central axis 236, e.g., such rotating auger 240 is a coaxial with smoke barrel 230. As shown, an outer diameter of rotating auger 240 is substantially equivalent to an inner diameter of smoke barrel 230, such that a helical blade 242 of rotating auger 240 may advance combustible material 162 within smoldering chamber 160 as rotating auger 240 is rotated about central axis 236. More specifically, the combustible material 162 is generally urged from first end 232 toward second end 234 of smoke barrel 230.

As illustrated, smoke generating assembly 150 may further include a hopper 244 that is generally configured for storing and selectively depositing combustible material 162 into smoldering chamber 160. More specifically, as illustrated, hopper 244 may be a large tapered reservoir with a top opening 246 positioned at top 104 of cabinet 102. A user may fill hopper 244 by pouring or providing combustible material 162 into hopper 244 through top opening 246. Hopper 244 may taper toward a supply opening 248 positioned at a bottom of hopper 244. As shown, supply opening 248 opens into smoldering chamber 160 at a top of smoke barrel 230. More specifically, supply opening 248 is joined to smoke barrel 230 proximate first end 232 of smoke barrel 230. In this manner, fresh combustible material 162 is typically provided into smoldering chamber 160 proximate first end 232 of smoke barrel 230 and is urged by rotating auger 240 toward second end 234 of smoke barrel 230. As illustrated, smoke barrel 230 may further define a discharge port 250 at second end 234 of smoke barrel 230 for discharging consumed combustible material 162.

As best shown in FIG. 6, smoke generating assembly 150 includes one or more smoldering heaters 252 which are positioned in smoldering chamber 160 or otherwise placed in thermal communication with combustible material 162 stored in smoldering chamber 160 for smoldering combustible material 162. According to an exemplary embodiment, smoldering heater 252 may include one or more cartridge heaters or silicon nitride igniters. Alternatively, smoldering heater 252 may include any other suitable type, position, and configuration of heating elements. As used herein, the term "heating element," "heaters," and the like may generally refer to electric resistance heating elements, gas burners, microwave heating elements, halogen heating elements, or suitable combinations thereof.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 252 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

According to the exemplary illustrated embodiment, smoldering heater 252 is positioned proximate second end 234 of smoke barrel 230, e.g., immediately adjacent smoke outlet 204. Specifically, as illustrated, smoke outlet 204 corresponds to discharge port 250 of smoke barrel 230, which may simply be an open end of smoke barrel 230. In this manner, as rotating auger 240 rotates, combustible material 162 positioned within smoldering chamber 160 is slowly but progressively advanced past smoldering heater 252. After combustible material 162 positioned near smoldering heater 252 is consumed or smoldered, rotating auger 240 may rotate to advance the consumed material toward discharge port 250 where it may be pushed out of smoldering chamber 160.

Specifically, as illustrated, smoldering heater 252 may be positioned underneath smoke barrel 230, e.g., within a solid smoldering surface 260 that is positioned in direct thermal contact with smoke barrel 230. According to other embodiments, smoldering surface 260 may be positioned within a notch defined in smoke barrel 230, e.g., for direct contact with combustible material 162. According other embodiments, smoldering heater 252 may be positioned on a distal end of rotating auger 240, e.g., aligned along central axis 236 proximate second end 234. According to still other embodiments, smoldering heater 252 may include multiple heating element and may be positioned at different locations along central axis 236 of smoke barrel 230. Other heater configurations are possible and within the scope of the present subject matter.

According to an exemplary embodiment, a container 270 may be configured for receiving consumed combustible material 162 when discharged from smoke barrel 230. In this regard, for example, container 270 may be positioned directly below discharge port 250 such that used combustible material 162 may fall therein and immediately extinguish. Alternatively, discharge port 250 may be connected to container 270 through a discharge duct (not shown). According to alternative embodiments, consumed combustible material 162 may be discharged in any other suitable manner into to any other suitable container or reservoir.

According to the illustrated embodiment, container 270 is filled with water 272 to immediately extinguish combustible material 162 when dropped into container 270. However, it should be appreciated that other liquids or materials for extinguishing combustible material 162 may be contained within container 270. In addition, as illustrated, container 270 may be positioned below or directly define a chamber inlet 274 that is positioned adjacent smoke outlet 204. In this manner, the flow of smoke 152 exiting smoke barrel 230 may pass directly into smoking chamber 120 through chamber inlet 274 while consumed combustible material 162 may fall directly into water 272 within container 270.

As best illustrated in FIG. 6, smoke generating assembly 150 may further include a drive mechanism 280 that is mechanically coupled to rotating auger 240. Controller 140 (or another dedicated controller) may be in operative communication with drive mechanism 280 and may be configured for intermittently rotating the rotating auger 240 to advance combustible material 162 along central axis 236. Specifically, as illustrated, drive mechanism 280 may include a drive motor 282 and a transmission assembly 284 or another suitable geared arrangement for transferring torque from drive motor 282 to rotating auger 240. As used herein, "motor" may refer to any suitable drive motor and/or transmission assembly for driving rotating auger 240. For example, drive motor 282 may be a brushless DC electric motor, a stepper motor, or any other suitable type or configuration of motor. For example, drive motor 282 may be an AC motor, an induction motor, a permanent magnet synchronous motor, or any other suitable type of AC motor. In addition, drive motor 282 and transmission assembly 284 may include any suitable motor or transmission sub-assemblies, clutch mechanisms, or other components.

In order to facilitate proper smoldering of combustible material 162, it may be desirable to drive rotating auger 240 intermittently, e.g., in a non-continuous manner. Specifically, according to an exemplary embodiment, rotating auger 240 may be rotated for a particular time duration once during every predetermined rotation period. For example, the time duration of rotation may be the amount of time drive mechanism 280 should drive rotating auger 240 to discharge all combustible material 162 that is smoldering from smoke barrel 230. In addition, the predetermined rotation period may be the amount of time necessary for a fresh portion of the smoldering material 162 to be consumed. Notably, drive mechanism 280 may discharge combustible material 162 from smoke barrel 230 before combustible material 162 is fully consumed, e.g., to prevent forming ash which may introduce acrid smoke flavors. According to an exemplary embodiment, the time duration of rotation is approximately 12 seconds while the predetermined rotation period is three minutes. Other rotation schedules are possible and within the scope of the present subject matter. Indeed, such rotation schedules may vary based on a variety of factors, such as the combustible material used, the temperature of the smoldering heater, the rate of air flow through smoke barrel 230, etc.

Thus, during operation of indoor smoker 100, air handler 186 draws the flow of combustion air 202 into smoldering chamber 160 through air inlet 200. The flow of combustion air 202 and combustible material 162 in the smoldering chamber 160 generate the flow of smoke 152 which is drawn into smoking chamber 120 as described herein. The flow of smoke 152 passes through smoking chamber 120 for performing a smoking process on food items positioned therein before exiting smoking chamber 120 through chamber outlet 180. Air handler 186 then continues to urge the flow of smoke 152 through catalytic converter 190 and exhaust duct 184 before passing out discharge vent 182.

In sum, aspects of the present disclosure are directed to systems and methods for generating high quality smoke by using a combination of a temperature controlled heated surface and an auger that advances wood pellets onto such heated surface. By keeping the temperature of said heater at a desired temperature (e.g., 700° F.) as wood pellets get pushed by the auger and contact the heater, they smolder at the right temperature for a controlled period of time. Once pellets have smoldered or smoked for a controlled period of time, the auger advances, pushing the consumed pellets away from the heater while moving fresh new pellets on top of the heater. This process is repeated to continuously generate high quality smoke.

In addition, the smoldered pellets may be advanced until they fall into a water reservoir or another device for quickly extinguishing the pellets. This process provides several advantages. For example, by extinguishing the smoldering pellets in water, smoke generation is stopped before pellets are turned completely into ash. Notably, once wood pellets start smoldering they would typically continue smoldering until they turn to ash because the smoldering process is a self-sustaining and exothermic process if given the right conditions. Therefore a way to stop the generation of smoke is important to avoid generating acrid smoke flavors. In addition, extinguishing the pellets in this manner allows the user to evacuate the cavity before opening the door to access the food. This prevents smoke from billowing out from the cavity into the kitchen/house. During evacuation, the igniter may be turned off and the auger may turn on for a period of time to push the smoking pellets into the water. The igniter cools down rapidly so new pellets are not smoldered. Another advantage of extinguishing the pellets in a water reservoir is that this generates puffs of steam which are introduced into the cavity, thereby keeping the cavity and food moist which helps the smoke molecules stick to the food to enhance the flavor.

Referring now specifically to FIGS. 4 and 7 through 9, a rack assembly 300 that may be used with indoor smoker 100 will be described according to exemplary embodiments of the present subject matter. In general, rack assembly 300 is positioned within smoking chamber 120 and is configured for both supporting racks and facilitating even distribution of smoke within smoking chamber 120. Although rack assembly 300 is described herein as being used with indoor smoker 100, it should be appreciated that aspects of the present subject matter may be used in any other suitable smoking appliance or any other appliance where even smoke or air distribution is desirable.

According to the illustrated embodiment, rack assembly 300 is positioned within smoking chamber 120 and includes one or more ladder racks 302 mounted to one or more chamber walls 122 of smoking chamber 120. In general, ladder racks 302 are secured to chamber walls 122 for supporting one or more racks 304 that define cooking surfaces on which meats or other smoking/cooking items may be placed. According to the illustrated embodiment, rack assembly 300 includes four racks 304 that extend in a horizontal plane and are spaced apart equidistantly along the vertical direction V within smoking chamber 120. However, according to alternative embodiments, ladder racks 302 may be configured for supporting racks 304 having any other suitable number, shape, size, geometry, etc.

Specifically, according to the illustrated embodiment, rack assembly 300 includes two ladder racks 302 positioned on laterally opposite side walls of smoking chamber 120. According to the illustrated embodiment, ladder racks 302 are identical to each other, such that the same ladder rack 302 may be used on either side of smoking chamber 120. According to alternative embodiments, ladder racks 302 may be mirror images of each other or may have entirely different constructions. Moreover, it should be appreciated that according to alternative embodiments, rack assembly 300 may include only a single ladder rack 302 supporting one end of each rack 304, while opposite ends of racks 304 may be supported in any other suitable manner from an opposing chamber wall 122. Ladder racks 302 may be formed from metal or any other suitably rigid and temperature-resistant material.

Figure 7:
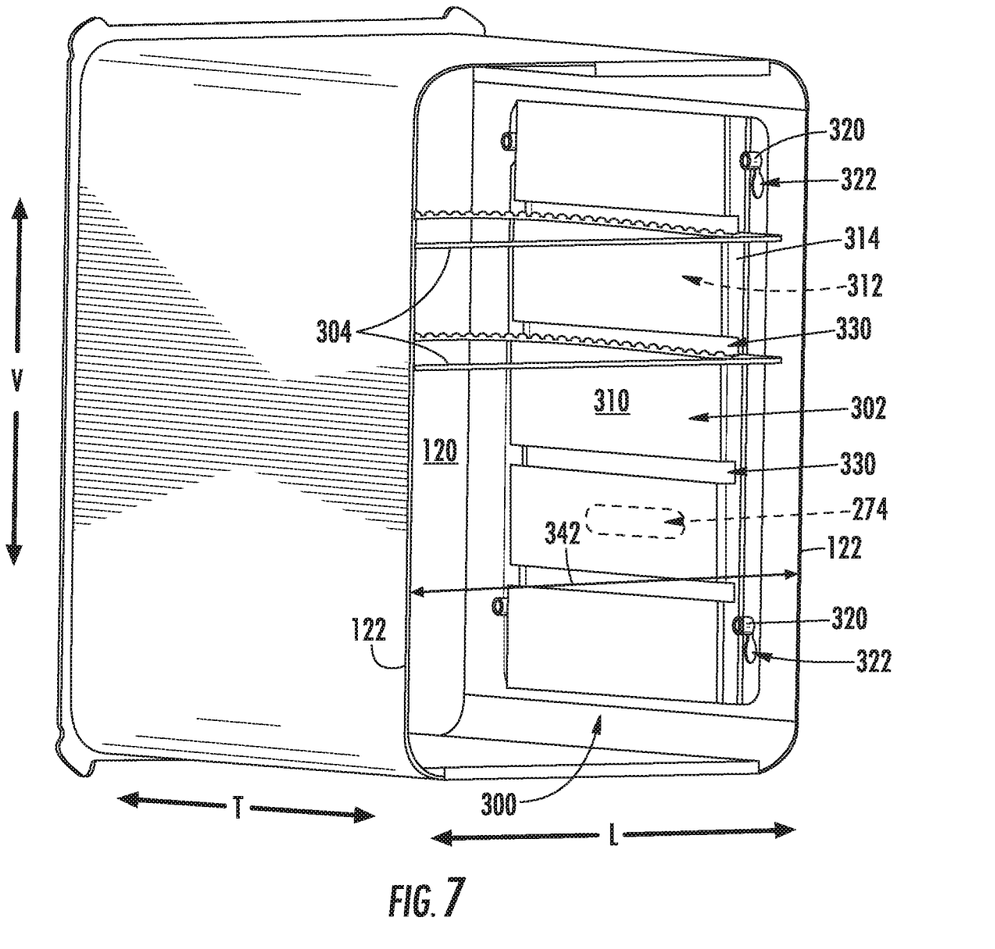
FIG. 7 provides a perspective view of a smoking chamber and rack assembly that may be used with the exemplary indoor smoker of FIG. 3 according to an exemplary embodiment of the present subject matter.
Figure 8:
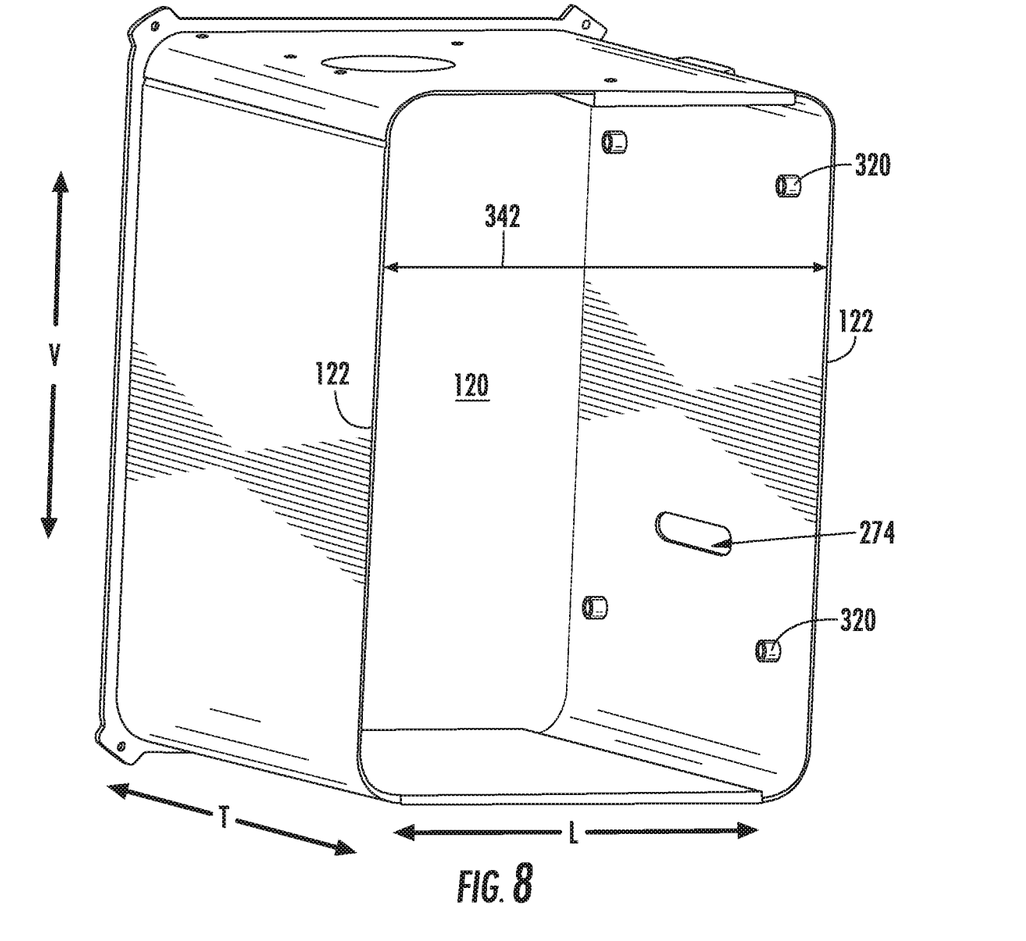
FIG. 8 provides a perspective view of the smoking chamber of FIG. 7 with the rack assembly removed for clarity.
Figure 9:
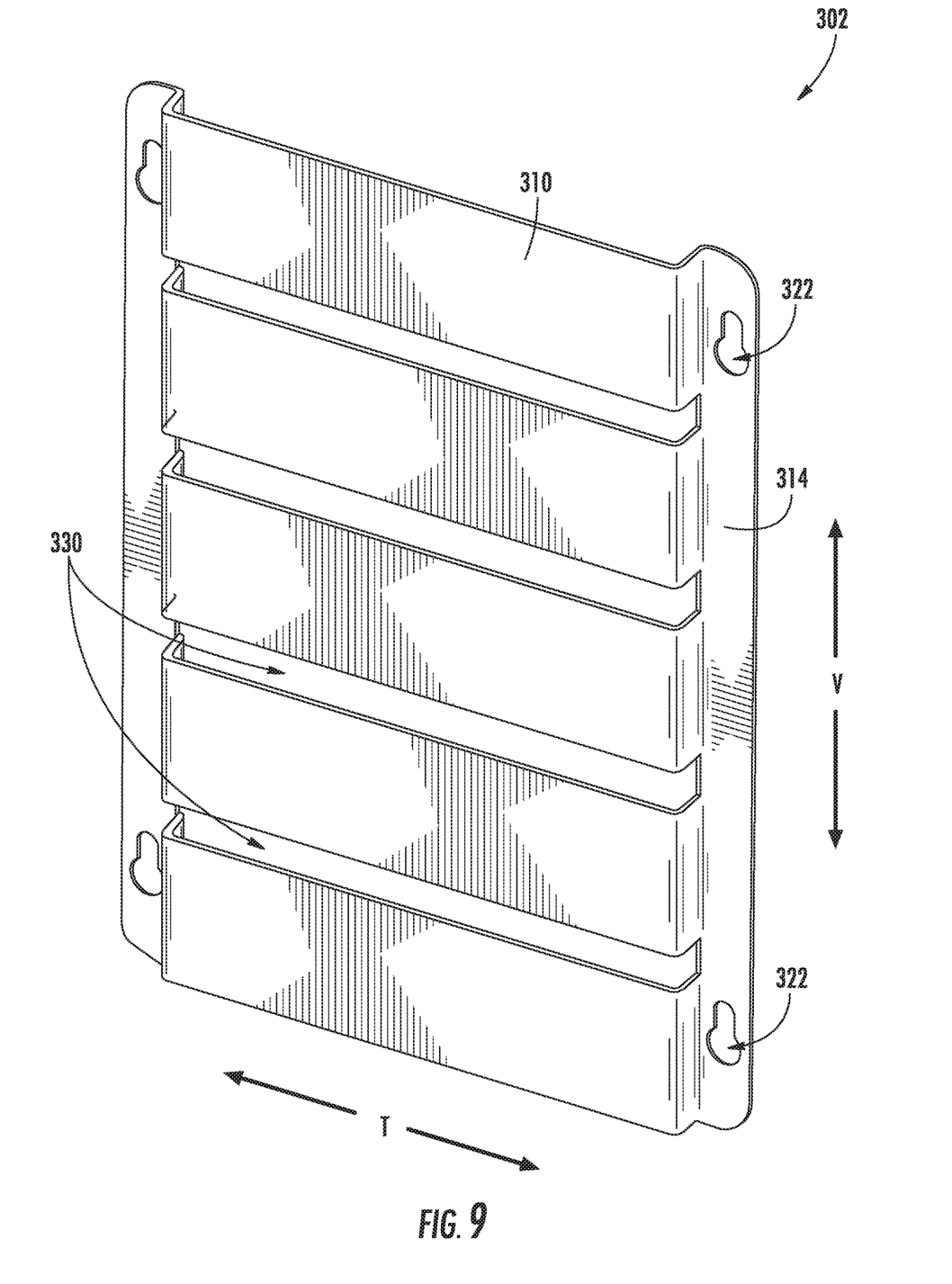
FIG. 9 provides a perspective view of the exemplary rack assembly of FIG. 7 according to an exemplary embodiment of the present subject matter.

As shown, each ladder rack 304 includes a support plate 310 that is spaced apart from chamber wall 122 define a flow plenum 312 therebetween. Specifically, according to the illustrated embodiment, ladder rack 302 further includes a plurality of L-shaped mounting flanges 314 (e.g., with the L-shape being defined in a horizontal plane H) that are mounted to chamber wall 122 to act as a standoff that spaces support plate 310 away from chamber wall 122. As best shown in FIGS. 7 through 9, rack assembly 300 may further include a plurality of shoulder bolts 320 that are attached to chamber wall 122. In addition, each mounting flange 314 may define shoulder slot apertures 322 for receiving the shoulder bolts 320 to secure ladder rack 302 to chamber wall 122. Although shoulder bolts 320 are described herein as being used to attach ladder rack 302 to chamber walls 122, it should be appreciated that according to alternative embodiments any other suitable means for mechanically attaching ladder rack 302 to chamber walls 122 may be used.

As best shown in FIGS. 4, 7, and 9, support plate 310 may further define one or more receiving slots 330. Receiving slots 330 may generally be any apertures defined in support plate 310 that are configured for supporting racks 304 or permitting the flow of smoke 152 to flow from the flow plenum 312 into smoking chamber 120. According to the illustrated embodiment, receiving slots 330 are horizontal slots that extend along the transverse direction T for slidably receiving racks 304 into smoking chamber 120. More specifically, according to the illustrated embodiment, rack assembly 300 includes two ladder racks 302, each having four horizontal receiving slots 330 positioned at fixed vertical locations within smoking chamber 120 to support four racks 304 in a horizontal orientation. In addition, as illustrated, receiving slots 330 may further be defined in or extend into mounting flanges 314, e.g., to permit racks 304 to slide into receiving slots 330.

Thus, according to the illustrated embodiment, a four-sided flow plenum 312 is substantially defined between chamber wall 122, support plate 310, and two mounting flanges 314 that are spaced apart along the transverse direction T. Notably, as best shown in FIGS. 7 and 8, chamber inlet 274 may be defined through chamber wall 122 to provide fluid communication between smoke generating assembly 150 and flow plenum 312. In this manner, the flow of smoke 152 may pass directly into flow plenum 312 where it is distributed along the vertical direction V and the transverse direction T. Notably, it may be desirable to misalign chamber inlet 274 and receiving slots 330. Thus, according to the illustrated embodiment, each of the one or more receiving slots 330 may be offset from chamber inlet 274 along the vertical direction V. In this manner, the flow of smoke 152 may have improved distribution throughout flow plenum 312.

In addition to distributing the flow of smoke 152 along chamber wall 122 (e.g., the sidewall of smoking chamber 120) before the smoke moves laterally into smoking chamber 120, ladder rack 302 on the opposite sidewall may also facilitate improved circulation of the flow of smoke 152 throughout smoking chamber 120. In this regard, for example, the flow of smoke 152 may pass into flow plenum 312 through receiving slots 330 and may be distributed between levels (e.g., between racks 304) within flow plenum 312 before passing back through another receiving slot 330 and into smoking chamber 120. Thus, if a large mass of meat is placed on one rack 304 that substantially blocks the flow of smoke 152 from passing from chamber inlet 274 to chamber outlet 180, flow plenum 312 may act as a bypass to permit that flow of smoke 152 to continue to circulate.

Notably, the size of flow plenum 312, chamber inlet 274, and receiving slots 230 may affect the distribution of the flow of smoke 152 into smoking chamber 120, and the dimensions of rack assembly 300 are designed for improved smoke distribution. In this regard, for example, ladder rack 302 may define a plenum width 340 that is measured along a horizontal direction H between support plate 310 and chamber wall 122. For example, plenum width 340 may be equivalent to a height of mounting flange 314 as measured along the lateral direction L. According to an exemplary embodiment, plenum width 340 may be greater than 5% of a total width 342 (e.g., measured along the lateral direction L) of smoking chamber 120. It should be appreciated that according to alternative embodiments, plenum width 340 may be between about 1% and 15%, between about 2% and 10%, between about 3% and 8%, or between about 4% and 7%, of total width 342.

In addition, each receiving slot 330 may define a flow area, e.g., equivalent to the total amount of cross-sectional flow area defined in both support plate 310 and mounting flanges 314. According to the illustrated embodiment, the flow area of each of receiving slots 330 is identical. However, according to alternative embodiments, the flow area of receiving slots 330 may vary in order to regulate the distribution of the flow of smoke 152 within smoking chamber 120. For example, according to an exemplary embodiment, the flow area of the receiving slots 330 toward a bottom of the ladder racks 302 may be larger than the flow area of receiving slots 330 toward a top of ladder racks 302. In this manner, the flow of smoke 152 may experience less resistance entering a bottom of smoking chamber 120, e.g., to counteract the tendency of the flow of smoke 152 to rise toward chamber outlet 180. In addition, chamber inlet 274 may be defined on a lower end of the chamber wall 122, e.g., to further encourage the flow of smoke 152 to distribute within the bottom of smoking chamber 120. For example, chamber inlet 274 may be defined within a bottom half, within the bottom quarter, or directly at the bottom of the chamber wall 122.

Rack assembly 300 as described herein provides features for both removably receiving racks 304 as well as evenly distributing the flow of smoke 152 throughout the smoking chamber 12 for an improved smoking process. Although exemplary rack positions, ladder rack constructions, receiving slots, and other features are described herein, it should be appreciated that such features may vary while remaining within the scope of the present subject matter. For example, ladder rack 302 may define other flow features, separate discharge apertures, flow directing features, etc. for improved smoke distribution within flow plenum 312. Other variations and modifications are possible and within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical direction and a horizontal direction, the indoor smoker comprising:
   a cabinet;
   a smoking chamber positioned within the cabinet, the smoking chamber being defined at least in part by a chamber wall that defines a boundary of the smoking chamber along the horizontal direction, the chamber wall defining a chamber inlet on a bottom half of the chamber wall;
   a smoke generating assembly positioned immediately adjacent the chamber inlet for providing a flow of smoke into the smoking chamber through the chamber inlet defined in the chamber wall; and
   a rack assembly positioned within the smoking chamber, the rack assembly comprising:
      a ladder rack mounted to the chamber wall, the ladder rack comprising a support plate that is spaced apart from the chamber wall to define a flow plenum, the support plate defining one or more receiving slots configured to permit the flow of smoke to pass from the flow plenum into the smoking chamber, wherein the chamber inlet is positioned between adjacent slots of the one or more receiving slots along the vertical direction such that the flow of smoke is impinged on the support plate at a location between adjacent receiving slots along the vertical direction such that at least a portion of the flow of smoke is directed along the vertical direction within the flow plenum to the adjacent slots; and
      one or more racks removably mountable in the receiving slots of the ladder rack.

2. The indoor smoker of claim 1, wherein the ladder rack comprises:
   a plurality of L-shaped mounting flanges mounted to the support plate for securing the support plate to the chamber wall.

3. The indoor smoker of claim 2, wherein the rack assembly comprises:
   a plurality of shoulder bolts attached to the chamber wall, wherein each of the plurality of mounting flanges defines shoulder slot apertures for receiving the plurality of shoulder bolts to secure the ladder rack to the chamber wall.

4. The indoor smoker of claim 1, wherein the ladder rack defines a plenum width measured along a horizontal direction between the support plate and the chamber wall, the plenum width being greater than five percent of a total width of the smoking chamber.

5. The indoor smoker of claim 1, wherein the rack assembly comprises two ladder racks positioned on opposite sides of the smoking chamber.

6. The indoor smoker of claim 5, wherein the two ladder racks are identical.

7. The indoor smoker of claim 1, wherein each of the one or more receiving slots define a flow area, wherein the flow area of at least one of the receiving slots is different than the flow area of another one of the receiving slots.

8. The indoor smoker of claim 1, wherein the one or more racks comprises:
   four racks spaced equidistantly along the vertical direction within the smoking chamber.

9. The indoor smoker of claim 1, wherein the smoke generating assembly comprises:
   a smoke barrel defining a smoldering chamber that extends between a first end and a second end along a central axis, the smoke barrel being configured for receiving combustible material;
   an auger positioned within the smoke barrel and being rotatable about the central axis for selectively urging the combustible material from the first end toward the second end of the smoldering chamber; and
   a smoldering heater in thermal communication with the smoke barrel for smoldering the combustible material as the auger advances the combustible material past the smoldering heater.

10. The indoor smoker of claim 9, wherein the smoke generating assembly further comprises:
    a hopper for depositing the combustible material into the smoldering chamber.

11. The indoor smoker of claim 9, wherein the smoke generating assembly further comprises:
    a drive mechanism for selectively rotating the auger; and
    a controller operably coupled to the drive mechanism and being configured for intermittently rotating the auger to advance the combustible material.

12. The indoor smoker of claim 1, further comprising:
an exhaust duct extending between a chamber outlet defined by the smoking chamber and a discharge vent defined by the cabinet;
an air handler fluidly coupled with the exhaust duct for urging the flow of smoke from the smoking chamber, through the exhaust duct, and out of the discharge vent; and
a catalytic converter positioned within the exhaust duct, the catalytic converter comprising a catalytic element and a catalyst heater.

13. The indoor smoker of claim 1, wherein the flow plenum is defined entirely by the chamber wall and the ladder rack.

14. The indoor smoker of claim 1, wherein an entirety of the support plate extends in a plane parallel to the chamber wall.

15. A rack assembly for an indoor smoker, the indoor smoker comprising a smoking chamber positioned within a cabinet and being defined at least in part by a chamber wall that defines a boundary of the smoking chamber along the horizontal direction, the chamber wall defining a chamber inlet on a bottom half of the chamber wall for receiving a flow of smoke from a smoke generating assembly positioned immediately adjacent the chamber inlet, the rack assembly comprising:
a ladder rack mounted to the chamber wall, the ladder rack comprising a support plate that is spaced apart from the chamber wall to define a flow plenum, the support plate defining one or more receiving slots configured to permit the flow of smoke to pass from the flow plenum into the smoking chamber, wherein the chamber inlet is positioned between adjacent slots of the one or more receiving slots along a vertical direction such that the flow of smoke is impinged on the support plate at a location between adjacent receiving slots along the vertical direction such that at least a portion of the flow of smoke is directed along the vertical direction to the adjacent slots; and
one or more racks removably mountable in the receiving slots of the ladder rack.

16. The rack assembly of claim 15, wherein the ladder rack comprises:
a plurality of L-shaped mounting flanges mounted to the support plate, each of the plurality of mounting flanges defining shoulder slot apertures; and
a plurality of shoulder bolts attached to the chamber wall, wherein the shoulder bolts are received within the shoulder slot apertures to secure the ladder rack to the chamber wall.

17. The rack assembly of claim 15, wherein the ladder rack defines a plenum width measured along a horizontal direction between the support plate and the chamber wall, the plenum width being greater than five percent of a total width of the smoking chamber.

18. The rack assembly of claim 15, wherein the rack assembly comprises two ladder racks positioned on opposite sides of the smoking chamber.

19. The rack assembly of claim 15, wherein each of the one or more receiving slots define a flow area, wherein the flow area of at least one of the receiving slots is different than the flow area of another one of the receiving slots.

20. The rack assembly of claim 15, wherein the flow plenum is defined entirely by the chamber wall and the ladder rack.

* * * * *